United States Patent
Svore et al.

(10) Patent No.: US 7,853,589 B2
(45) Date of Patent: Dec. 14, 2010

(54) WEB SPAM PAGE CLASSIFICATION USING QUERY-DEPENDENT DATA

(75) Inventors: Krysta Svore, Seattle, WA (US); Chris Burges, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 326 days.

(21) Appl. No.: 11/742,156

(22) Filed: Apr. 30, 2007

(65) Prior Publication Data

US 2008/0270376 A1 Oct. 30, 2008

(51) Int. Cl.
*G06F 17/30* (2006.01)
(52) U.S. Cl. ......................... 707/728; 709/206; 707/780
(58) Field of Classification Search ................. 707/200, 707/102, 3, 723, 713, 705, 730, 729, 728; 709/709, 206
See application file for complete search history.

(56) References Cited

U.S. PATENT DOCUMENTS

| | | | | |
|---|---|---|---|---|
| 5,826,260 | A * | 10/1998 | Byrd et al. | 1/1 |
| 6,480,837 | B1 * | 11/2002 | Dutta | 1/1 |
| 6,785,671 | B1 * | 8/2004 | Bailey et al. | 707/3 |
| 6,978,274 | B1 * | 12/2005 | Gallivan et al. | 707/102 |
| 7,349,901 | B2 * | 3/2008 | Ramarathnam et al. | 707/706 |
| 7,716,198 | B2 * | 5/2010 | Meyerzon et al. | 707/706 |
| 7,769,751 | B1 * | 8/2010 | Wu et al. | 707/728 |
| 2002/0198869 | A1 * | 12/2002 | Barnett | 707/3 |
| 2002/0199095 | A1 * | 12/2002 | Bandini et al. | 713/151 |
| 2003/0037074 | A1 * | 2/2003 | Dwork et al. | 707/500 |
| 2004/0177110 | A1 | 9/2004 | Rounthwaite | |
| 2004/0215606 | A1 | 10/2004 | Cossock | |
| 2005/0015626 | A1 | 1/2005 | Chasin | |
| 2005/0120019 | A1 | 6/2005 | Rigoutsos | |
| 2005/0216564 | A1 * | 9/2005 | Myers et al. | 709/206 |
| 2006/0004748 | A1 * | 1/2006 | Ramarathnam et al. | 707/6 |
| 2006/0015561 | A1 | 1/2006 | Murphy | |
| 2006/0095416 | A1 | 5/2006 | Barkhin | |
| 2006/0184500 | A1 | 8/2006 | Najork | |
| 2006/0253581 | A1 | 11/2006 | Dixon | |
| 2006/0294155 | A1 * | 12/2006 | Patterson | 707/200 |
| 2007/0038600 | A1 | 2/2007 | Guha | |

FOREIGN PATENT DOCUMENTS

| | | |
|---|---|---|
| KR | 10-2004-0072059 | 9/2004 |
| KR | 10-2004-0103763 | 12/2004 |

OTHER PUBLICATIONS

B. Wu and B. Davison, "Identifying Link Farm Spam Pages" Dept. of Computer Science, May 2005.

S. Adah, T. Liu, M. Ismail, "Optimal Link Bombs are Uncoordinated" Dept. of Computer Science, 2005.

(Continued)

*Primary Examiner*—Luke S. Wassum
*Assistant Examiner*—Sherief Badawi
(74) *Attorney, Agent, or Firm*—Joseph R. Kelly; Westman, Champlin & Kelly, P.A.

(57) ABSTRACT

A web spam page classifier is described that identifies web spam pages based on features of a search query and web page pair. The features can be extracted from training instances and a training algorithm can be employed to develop the classifier. Pages identified as web spam pages can be demoted and/or removed from a relevancy ranked list.

18 Claims, 5 Drawing Sheets

OTHER PUBLICATIONS

A. Benczur, K. Csalogany, T. Sarlos, M. Uher "SpamRank-Fully Automatic Link Spam Detection" Computer and Automation Research Institute, 2002.

L. Becchetti, C. Castillo, D. Donato, S. Leonardi and R. Baeza-Yates, "Using rank propagation and probabilistic counting for link-based spam detection" Proceedings of the Workshop on Web Mining, Aug. 2006.

A. Ntoulas, M. Manasse, M. Najork and D. Fetterly, "Detecting Spam Web Pages through Content Analysis" Microsoft Research, May 2006.

Z. Gyongyi and H. Garcia-Molina, "Web Spam Taxonomy" Standford University Computer Science Department, 2005.

Z. Gyongyi and D. Garcia-Molina "Link Spam Alliances" Computer Department Stanford University, 2005.

D. Fetterly, M. Manasse and M. Najork "Spam, damn spam, and statistics" Microsoft Research, Jun. 17-18, 2004.

C. Castillo et al. "A Reference Collection for Web Spam" Universita degli Studi, Milan, Italy, Dec. 2006.

P. Metaxas and J. DeStefano "Web Spam, Propaganda and Trust" Computer and Science Department/Math and Computer Department, May 2005.

PCT International Search Report, PCT/US2008/058637, Mar. 28, 2008.

Chile Patent Application No. 1189-2008 First Office Action dated Apr. 24, 2008.

Chilean Patent Application No. 1189-2008 Second Office Action dated Apr. 24, 2008.

* cited by examiner

WEB SPAM PAGE CLASSIFICATION USING QUERY-DEPENDENT DATA

BACKGROUND

As the amount of information on the World Wide Web grows, the use of search engines to find relevant information becomes ever more critical. A search engine retrieves pages relevant to a user's query by comparing the attributes of pages, together with other features such as anchor text, and returns those that best match the query. The user is then typically shown a ranked list of Universal Resource Locators (URLs) of between 10 and 20 per page. The ranking of pages by search engines has proved to be a crucial component of how users browse the web. This situation arises not only from the simple gathering of information for users, but also from commercial transactions that result from the search activity.

Some commercial companies, to increase their website traffic, hire search engine optimization (SEO) companies to improve their site's ranking. There are numerous ways to improve a site's ranking, which may be broadly categorized as white-hat and gray-hat (or black-hat) SEO techniques. White-hat SEO methods focus on improving the quality and content of a page so that the information on the page is useful for many users. Such a method for improving a site's rank may be to improve the content of the site, such that it appears most relevant for those queries one would like to target.

However, there are many methods of improving ranking. Gray-hat and black-hat SEO techniques include methods such as link stuffing, keyword stuffing, cloaking, web farming, and so on. Link stuffing is the practice of creating many pages that have little content or duplicated content, all which link to a single optimized target page. Ranking based on link structure can be fooled by link-stuffed pages by thinking that the target page is a better page since so many pages link to it. Keyword stuffing is when a page is filled with query terms, making it appear very relevant to a search whose query contains one or more of those terms, even though the actual relevance of the page may be low. A keyword-stuffed page will rank higher since it appears to have content relevant to the query. For over-loaded terms on the page, the page will appear higher in the search results and will ultimately draw users to click on the site.

White-hat techniques can result in a better web search experience for a user. In particular, the user is provided with satisfactory results based on the original intent of the search query. In contrast, gray-hat or black-hat techniques can derail the user's search process in the hope of persuading the user to buy something they were not originally looking for.

SUMMARY

A web spam page classifier is described that identifies web spam pages based on features of a search query and web page pair. The web page is identified by a URL. The features can be identified based on spamming techniques that detract from a search experience for a user. The features can be extracted from training instances and a training algorithm can be employed to develop the classifier. During operation, pages identified as web spam pages can be demoted and/or removed from a relevancy ranked list.

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
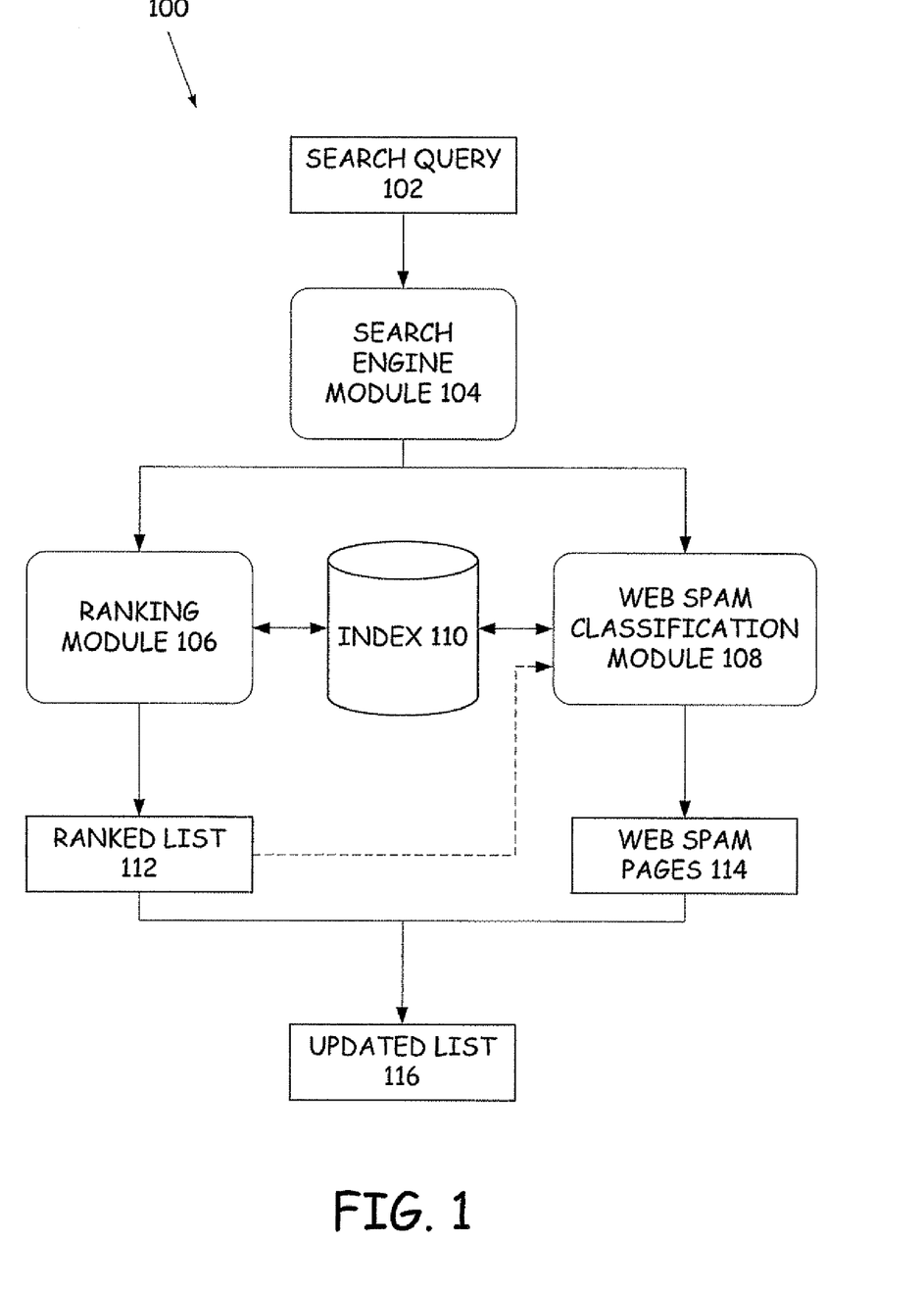
FIG. 1 is a block diagram of a search engine system.

FIG. 1 is a block diagram of a search engine system 100 for receiving a search query and rendering a list of results based on the search query. During operation, system 100 receives a search query 102 from a user. The search query includes one or more terms for which the user desires to acquire further information. In some instances, the user operates a computing device such as a mobile device or personal computer to enter the search query 102. In turn, the search query 102 is sent to a search engine module 104 through a suitable means of communication. Search engine module 104 processes search query 102 to extract and/or identify features or attributes of the query and provide these features to a ranking module 106 and a web spam classification module 108. Although herein illustrated and discussed as being separate modules, ranking module 106 and web spam classification module 108 can be combined into a single module as desired.

Ranking module 106 accesses an index 110 that contains information related to a plurality of web pages. Web pages are identified uniquely by a URL. The URL includes a particular domain as well as a path to the particular page. There are several known methods for creating an index of web pages that can be accessed based on a search query. Among other things, index 110 can catalog words, titles, subtitles, metatags and/or any other information related to a particular web page and its corresponding domain. Based on a comparison of search query 102 to index 110, ranking module 106 outputs a ranked list 112 of web pages ranked by relevance to the query. Ranked list 112 can be rendered in a web page where the top results (i.e. the top 10 or 20 results) are rendered with hyperlinks that link to web pages.

Ranking module 106 can be driven by a ranking algorithm that identifies features of the search query 102, web pages under consideration and relationships of terms in the search query with content of the web pages. Example features include a most frequent term in the web page, a number of times a particular term appears in the web page, a domain name associated with the web page (i.e., www.example.com), a number of links pointing to the page, whether a query term appears in a title of the web page, etc. Based on these features, the ranking algorithm can perform a calculation as to the relevancy value of a page given a query. This calculation can be performed as a function of feature vectors.

In some instances, ranked list 112 may include one or more web spam pages. These web spam pages are designed to increase ranking based on ranking module 106 and do not increase quality or content of the page. These web spam pages are of limited value to a user and simply do not reveal as high quality of content of an actual relevant page. Elimination of web spam pages from search results can be important for several reasons. A user may choose to use a different search engine if web spam pages receive high rankings and other legitimate sites may utilize spamming techniques to improve ratings. Ultimately, web spam pages negatively affect user experience, rankings of pages and processing costs.

To combat web spam pages, system 100 utilizes web spam classification module 108 to identify a list of web spam pages 114 as a function of the search query 102 and a comparison to index 110. Alternatively, web spam classification module 108 can identify spam pages directly from ranked list 112. Lists 112 and 114 are combined to provide an updated list 116 that can be provided to the user. Updated list 116 can demote web spam pages to a lower position in list 112 and/or eliminate web spam pages from the list. Web spam classification module 108 can be driven by a classifier designed to label a given web page as spam or non-spam.

In one example, the classifier can perform a calculation based on the same or similar features utilized by the ranking algorithm associated with ranking module 106. This use of features can be advantageous since features for the query and pages are already extracted for operation of ranking module 106. Furthermore, by training a classifier on these features to locate spam web pages, outliers of a distribution for highly ranked pages can be an indication of web spam. For example, a web page that stuffs numerous keywords into its page for the purpose of increasing its relevancy ranking will be likely to have more keywords than a legitimate site for a particular keyword. By training the classifier to recognize these situations, web spam pages can be more accurately identified.

Figure 2:
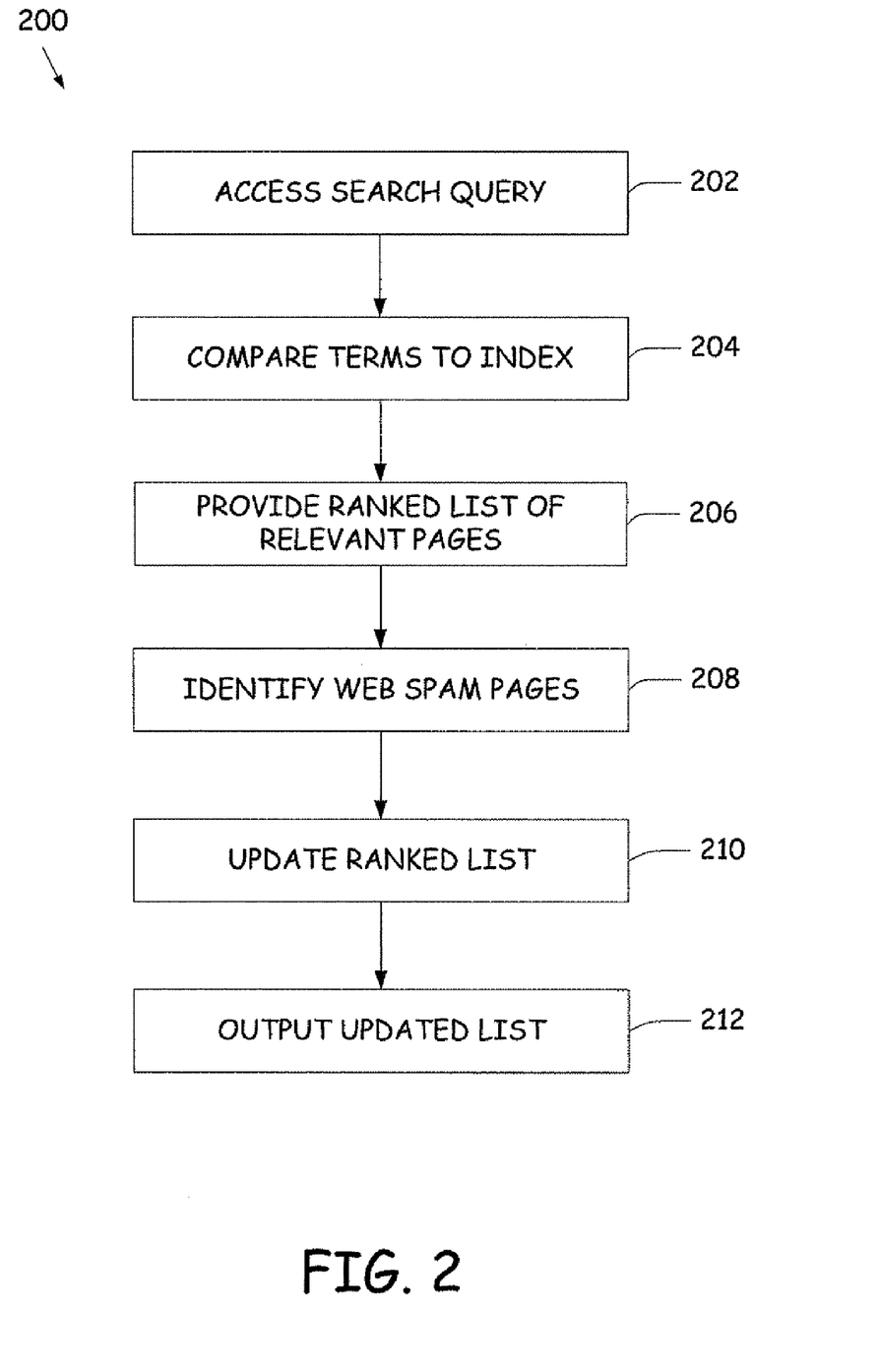
FIG. 2 is a flow diagram of a method for rendering search results to a user based on a query.

FIG. 2 is a method 200 performed by system 100 to provide list 116 to the user. At step 202, the search query 102 is accessed by search engine module 104. In Internet based search engines, a user is located remotely from the search engine module and enters the search query into a suitable web browser. At step 204, query terms from search query 102 are compared to index 110 and the ranked list of relevant pages is provided at step 206. Web spam pages are then identified at step 208 using web spam classification module 108 and an updated ranked list is provided at step 210. If one or more web spam pages are identified they can be removed from the ranked list or demoted to a lower ranking in the list, for example, by 10, 20, 25 or more positions. The updated list is output to the user at step 212.

Figure 3:
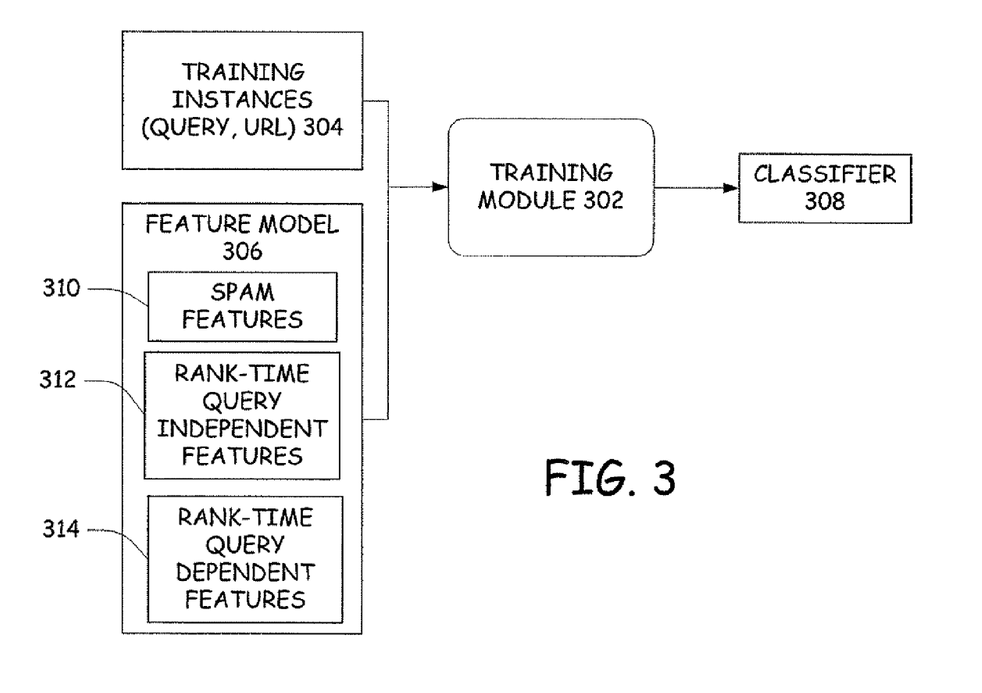
FIG. 3 is a block diagram of a classifier training system.

FIG. 3 is a block diagram of a system 300 for training a classifier of web spam classification module 108. System 300 includes a training module 302 that receives input in the form of training instances 304 and a feature model 306. Based on the training instances 304 and feature model 306, a classifier 308 is output. Feature model 306 includes spam based features 310, rank-time query independent features 312 and rank-time query dependent features 314.

To detect web spam pages, classifier 308 labels a given web page as spam or not spam. To develop classifier 308, the training module utilizes training and testing data that is composed of a number of labeled instances 304, or samples, where each sample has a vector of attributes, or features. In one example, the labels are determined by human judges. Classification involves producing a feature model 306 during training to predict the label of each instance in the test in a set given only the vector of feature values. To construct classifier 308, training instances 304 are used to determine the parameters of classifier 308. During testing, the classifier 308 examines a vector of features jointly to determine, based on the feature values, if a web page is spam or not. The classifier 308 is evaluated during testing by comparing the label given by the classifier with the instance's assigned label.

The classifier 308 can be trained using a suitable learning method. One example is a support vector machine (SVM). However, there are many different classification algorithms that can be used to detect web spam. At a high level, a SVM produces a linear separating hyperplane between the feature vectors for two class labels (i.e. spam and non-spam) in a transformed version of the feature space. Instances are then classified based on where they lie in a transformed version of feature space. The SVM finds the separating hyperplane with maximal margin in the high-dimensional space.

Classifier 308 is based on page-level, content-based classification, as opposed to host-level classification or link-level classification. It is worth noting that classifier 308 could be used in conjunction with a domain-level or link-level classifier, by using classifier 308 at rank time and another classifier at index-generation time, for example. Features based on domain and link information, however, may be used in the classifier. Training instances 304 include a large set of human-labeled (query, URL) pairs, although other approaches for obtaining training instances 304 can be used. In one instance, queries can be determined by looking at search engine query logs for a search engine such as Microsoft Live Search (available at www.live.com) provided by Microsoft Corporation of Redmond, Wash. The queries can be sampled such that the set of queries represent a realistic distribution of queries that users would submit to a search engine. The query frequencies are determined from toolbar data as well as query logs. Queries include commercial queries, spam, queries, and non-commercial queries.

When using human labels, a human judge is given the list of queries and issues each query to a search engine. A returned list of 10 results with snippets is shown to the judge. For each URL appearing in the top 10 returned search results, the judge labels the URL as spam, not spam, or unknown. The judgment is made based on the quality of content, the use of obvious spam techniques, and whether or not the result should appear in the top 10.

Spam features 310 include page-level attributes. The attributes include domain-level features, page-level features, and link information. Values of these features can be determined by mining feature information for each URL in the testing and training sets. Examples of such features include the number of spammy in-links, the top level domain of the site, quality of phrases in the document and density of keywords (spammy terms). The number of spammy in-links is the number of in-links coming from labeled spam pages. The quality of phrases in the document is a score that indicates the quality of terms on the page. The density of keywords is a score that indicates how many terms on the page are spam terms.

In addition to spam features 310, feature model 306 includes rank-time features. Rank-time features are features extracted for use in the ranking algorithm. A large number of web spam pages appear in ranked search results. In order to receive a high rank, web spam pages must contain content that "fools" algorithms used for populating the index and for ranking search results. These algorithms take feature vectors as input, where the feature vectors have a specific distribution over the feature set. The distribution is difficult for a spammer to match without knowledge of how the crawling, indexing, and ranking algorithms work. Even though ranking module 106 believes the web spam page to be highly relevant, classifier 308, with the same feature data as input, but trained on spam labels, should be able to easily identify web spam pages, since they will be outliers of the distribution. Since ranking module 106 is trained to solve a different problem, namely the ordering of relevant pages, not the identification of web spam pages, by using a separate classifier trained to catch web spam, web spam can be demoted and/or removed in the ranked results.

Rank-time features can be separated into query-independent features 312 and query-dependent features 314. The query-independent rank-time features 312 can be grouped into page-level features, domain-level features, anchor features, popularity features, and time features.

Page-level features are features that can be determined by looking just at a page or URL. Examples of page-level features include static rank features, the count of the most frequent term, the count of the number of unique terms, the total number of terms, the number of words in the path, and the number of words in the title.

Domain-level features are computed as averages across all pages in a domain while other modes of calculation can be used. Examples of domain-level features include the rank of the domain, the average number of words, and the top-level domain.

Popularity features are features that measure the popularity of pages through user data. Popularity features can be derived from toolbar data, where the user has agreed to provide access to data collected during a logged session. The popularity features can include domain- and page-level features. Example features are the number of hits within a domain, the number of users of a domain, the number of hits on a URL, and the number of users of a URL. Time features include the date the URL was crawled, the last date page changed, and the time since the page was crawled. Other features, such as frequent term counts, anchor text features, etc. can also be used. Exemplary rank-time query-independent features are listed in Table 1.

TABLE 1

Rank-time query independent features.

Page level: static rank, most frequent term, number of unique terms, total number of terms, number of words in path, number of words in title
Domain level: domain rank, average number of words, top-level domain
Popularity: domain hits, domain users
Time: date crawled, last change date, time since crawled Query-dependent features 314 are content features that relate to the one or more terms in search query 102. This feature set can include several hundred query-dependent features. Query-dependent features are generated from the query, document content, and URL. Query-dependent features can depend just on the query or on the match between query and document properties. Examples of query-dependent features include the number of query terms in the title and the frequency of a query term on the page, as well as various counts of the occurrences of the query term across all documents, the number of documents that contain the query term, and n-grams over the query terms and the document. Table 2 lists several example query dependent features that can be used in classifier 308.

TABLE 2

Rank-time query-dependent features.

Number of query terms in title
Frequency counts of query terms in the page
Frequency counts of query terms over all documents in a domain
Number of documents containing query terms
N-grams over query terms/page Although query-dependent features are utilized in classifier 308, a spam label is not necessarily query-dependent. Currently, however, classifier 308 is utilized such that a query is issued and then each returned page is examined to determine if it is spam or not. In instances where different queries yield different results as to whether a page is spam or not can be corrected if desired.

Figure 4:
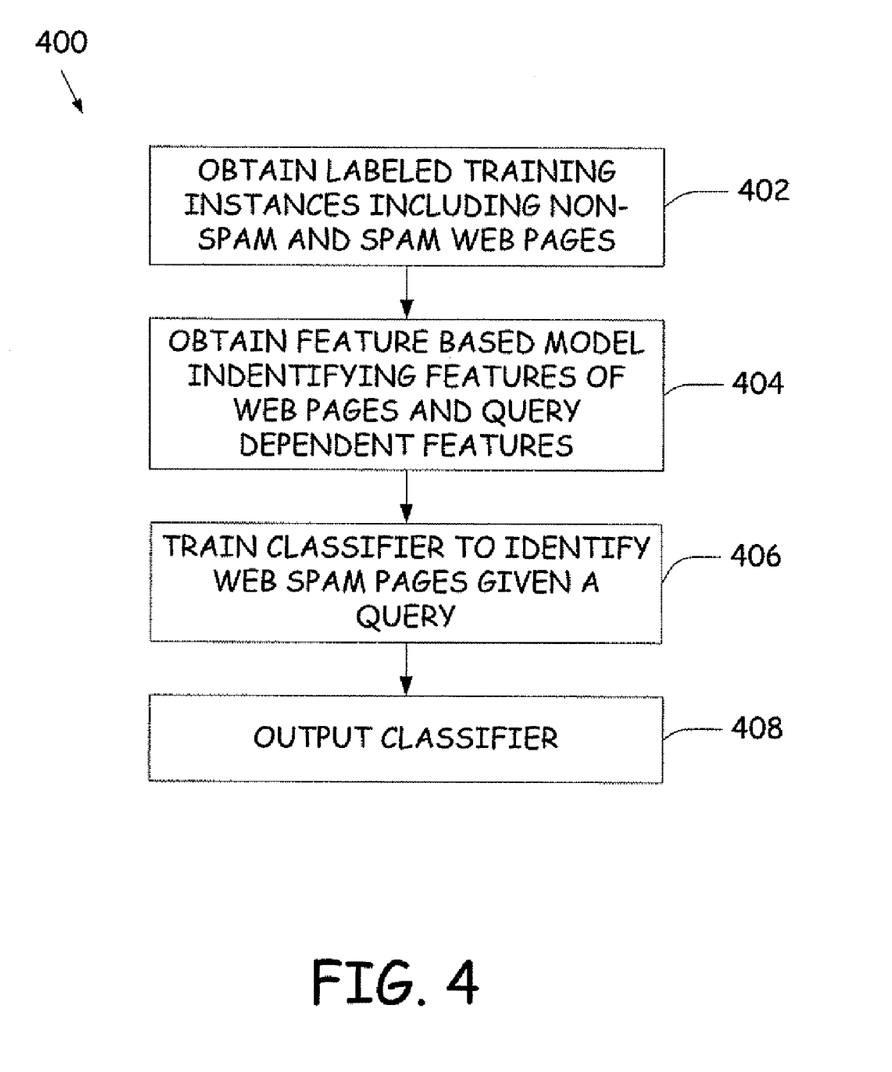
FIG. 4 is a flow diagram of a method for training a classifier.

FIG. 4 is a method 400 for outputting classifier 308 that can be used by web Spam classification module 108. At step 402, labeled training instances including a query and a URL are obtained. These instances include both non-spam web pages and spam web pages. A feature based model is obtained at step 404 to identify features of web pages as well as features of relationships between queries and web pages. At step 406, the classifier is trained to identify web spam pages given a query. Furthermore, at step 408, the classifier is output.

Using an extended set of features based on query terms (i.e.) rank-time content can be effective in classifying web spam pages Since one goal of spammers is to generate data to fool search engine ranking algorithms, identifying tell-tale properties of data in web spam pates can be detected by secondary classifiers.

The above description of illustrative embodiments is described in accordance with a search engine receiving a query and determining if a given page is web spam as a function of the query. Below is a suitable computing environment that can incorporate and benefit from these embodiments, for example within systems 100 and 300 or to perform methods 200 and 400. The computing environment shown in FIG. 5 is one such example that can be used to implement a portion or all of these systems and/or methods.

Figure 5:
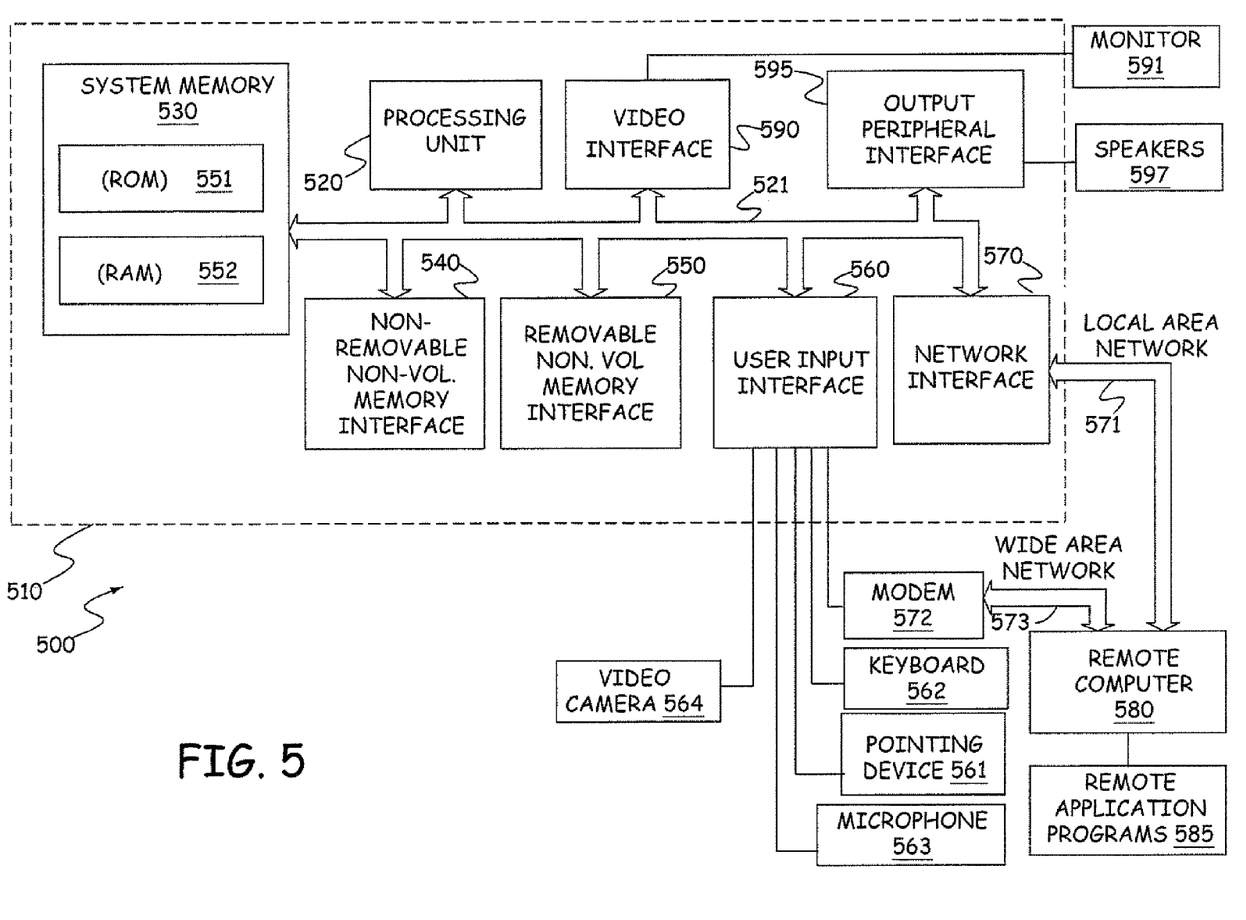
FIG. 5 is a block diagram of a general computing environment.

In FIG. 5, the computing system environment 500 is only one example of a suitable computing environment and is not intended to suggest any limitation as to the scope of use or functionality of the claimed subject matter. Neither should the computing environment 500 be interpreted as having any dependency or requirement relating to any one or combination of components illustrated in the exemplary computing environment 500.

Computing environment 500 illustrates a general purpose computing system environment or configuration. Examples of well-known computing systems, environments, and/or configurations that may be suitable for use with the service agent or a client device include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Concepts presented herein may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

Exemplary environment 500 for implementing the above embodiments includes a general-purpose computing system or device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data.

The system memory 530 includes computer storage media in the form of volatile and/or nonvolatile memory such as read only memory (ROM) 531 and random access memory (RAM) 532. The computer 510 may also include other removable/non-removable volatile/nonvolatile computer storage media. Non-removable non-volatile storage media are typically connected to the system bus 521 through a non-removable memory interface such as interface 540. Removeable non-volatile storage media are typically connected to the system bus 521 by a removable memory interface, such as interface 550.

A user may enter commands and information into the computer 510 through input devices such as a keyboard 562, a microphone 563, a pointing device 561, such as a mouse, trackball or touch pad, and a video camera 564. These and other input devices are often connected to the processing unit 520 through a user input interface 560 that is coupled to the system bus, but may be connected by other interface and bus structures, such as a parallel port or a universal serial bus (USB). A monitor 591 or other type of display device is also connected to the system bus 521 via an interface, such as a video interface 590. In addition to the monitor, computer 510 may also include other peripheral output devices such as speakers 597, which may be connected through an output peripheral interface 595.

The computer 510, when implemented as a client device or as a service agent, is operated in a networked environment using logical connections to one or more remote computers, such as a remote computer 580. The remote computer 580 may be a personal computer, a hand-held device, a server, a router, a network PC, a peer device or other common network node, and typically includes many or all of the elements described above relative to the computer 510. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on remote computer 580. It will be appreciated that the network connections shown are exemplary and other means of establishing a communications link between computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of processing web pages implemented by a computer with a processor, comprising:
   receiving with the processor a search query including at least one term;
   generating a query-dependent feature vector of features from the search query;
   comparing with a search engine implemented by the processor the query-dependent feature vector to information corresponding to a plurality of web pages to obtain a query-dependent ranking feature vector of query-dependent ranking features indicative of the comparison;
   identifying, with a ranking module, a ranked list of web pages relevant to the search query based on the ranking feature vector obtained from the comparison of the query-dependent feature vector to information corresponding to the plurality of web pages;
   after identifying the ranked list of web pages, providing the query-dependent feature vector and the ranking feature vector to a classifier and classifying, with the classifier that is separate from the search engine and the ranking module, web spam pages from the ranked list of web pages as a function of the query-dependent feature vector and the ranking feature vector, wherein web pages from ranked list of web pages are classified as web spam pages by detecting distribution patterns of some of the same query-dependent ranking features previously used to identify the web pages in the ranked list as relevant to the search query;
   updating the ranked list of web pages based on the identified web spam pages and the plurality of web pages as a function of the search query; and
   providing the ranked list of web pages to a user.

2. The method of claim 1 and further comprising:
   generating the query-dependent feature vector by extracting query features of the search query as a function of the at least one term and the information corresponding to the plurality of web pages;
   performing a calculation for each web page in the ranked list based on the extracted query features to classify the web page as a web spam page or a non-web spam page.

3. The method of claim 2 wherein the query features include at least one of a number of terms in the search query in a title of each web page, a frequency count of terms in the search query that are in each web page, a frequency count of terms in the search query that are in all web pages of a domain, a number of web pages that contain terms in the search query and multiple terms that are in both the search query and each web page.

4. The method of claim 2 wherein the query features include features indicative of web spam pages, and features dependent on the search query.

5. The method of claim 2 wherein the query features include page-level, domain-level, popularity and time based features.

6. The method of claim 1 wherein updating includes one of demoting web spam pages in the ranked list and removing web spam pages from the ranked list.

7. A computer-implemented system of processing web pages using a computer with a computer processor, comprising:
- a search engine module receiving a search query including at least one term, generating a query-dependent feature vector of query features from the search query, and identifying relevant web pages that are relevant to the search query using the query-dependent feature vector;
- a ranking module comparing the query-dependent feature vector for the search query to information corresponding to the relevant web pages to output a ranked list of web pages the rank being based on how relevant the web pages are to the query;
- a web spam classification module, separate from the ranking module, receiving the query-dependent feature vector and identifying web spam pages from the ranked list of web pages by comparing the query-dependent feature vector to the ranked list of web pages to determine whether a given web page in the ranked list of web pages has feature vectors within a given distribution, the ranked list being re-ranked based on the identified web spam pages in the ranked list of web pages;
- an output module providing the ranked list of web pages, after it is re-ranked; and
- wherein the computer processor is a functional component of the system and is activated by the web spam classification module to facilitate identification of web spam pages and re-ranking of the ranked list.

8. The system of claim 7 and further comprising wherein the ranking module extracts the query features from the search query as a function of the at least one term in the search query and extracts ranking features from a comparison of the query features to the information corresponding to the plurality of web pages and wherein the web spam classification module performs a calculation of each web page based on the extracted ranking features and the extracted query features to classify the web page as a web spam page or a non-web spam page.

9. The system of claim 8 wherein the ranking features include at least one of a number of terms in the search query in a title of each web page, a frequency count of terms in the search query that are in each web page, a frequency count of terms in the search query that are in all web pages of a domain, a number of web pages that contain terms in the search query and multiple terms that are in both the search query and each web page.

10. The system of claim 8 wherein the ranking features include features indicative of web spam pages, features independent of the search query and features dependent on the search query.

11. The system of claim 8 wherein the ranking features include page-level, domain-level, popularity and time based features.

12. The system of claim 7 wherein the web spam classification module performs one of demoting web spam pages in the relevancy list and removing web spam pages from the relevancy list.

13. The system of claim 7 wherein the information corresponding to the plurality of web pages is stored in an index accessible by the ranking module.

14. A computer-implemented training system for constructing a classifier using a computer with a computer processor, comprising:
- a set of training instances, each instance including a query identifier and a page identifier;
- a feature model identifying features related to web pages and related to relationships between the query identifier and information in the web pages;
- a training module accessing the set of training instances and the feature model to train and output a classifier, separate from a search engine, that labels a given web page as spam or non-spam based on a query-dependent feature vector of query features generated from an input search query and a feature vector of ranking features corresponding to the given web page, wherein the given web page is labeled as spam based on a distribution of query features within the given web page; and
- wherein the computer processor is a functional component of the system and is activated by the feature model and the training module to facilitate training and outputting the classifier.

15. The training system of claim 14 wherein the training module utilizes a support vector machine to identify a hyperplane as a function of the features to construct the classifier.

16. The training system of claim 14 wherein the features identified by the feature model include features indicative of web spam pages, features independent of the search query and features dependent on the search query.

17. The training system of claim 14 wherein the features identified by the feature model include at least one of a number of terms in the search query in a title of each web page, a frequency count of terms in the search query that are in each web page, a frequency count of terms in the search query that are in all web pages of a domain, a number of web pages that contain terms in the search query and multiple terms that are in both the search query and each web page.

18. The training system of claim 14 wherein the features identified by the feature model include page-level, domain-level, popularity and time based features.

* * * * *